United States Patent
Kanumolu

(10) Patent No.: US 10,572,549 B2
(45) Date of Patent: Feb. 25, 2020

(54) NETWORKED DATABASE CONNECTIVITY

(71) Applicant: salesforce.com, inc., San Francisco, CA (US)

(72) Inventor: Chaithanya Kanumolu, Narendra Nagar (IN)

(73) Assignee: salesforce.com, inc., San Francisco, CA (US)

( * ) Notice: Subject to any disclaimer, the term of this patent is extended or adjusted under 35 U.S.C. 154(b) by 447 days.

(21) Appl. No.: 15/153,412

(22) Filed: May 12, 2016

(65) Prior Publication Data

US 2017/0214749 A1    Jul. 27, 2017

(30) Foreign Application Priority Data

Jan. 27, 2016  (IN) .............................. 201641002846

(51) Int. Cl.
*H04L 29/06* (2006.01)
*G06F 16/951* (2019.01)

(52) U.S. Cl.
CPC .......... *G06F 16/951* (2019.01); *H04L 63/029* (2013.01); *H04L 63/0263* (2013.01); *H04L 63/102* (2013.01)

(58) Field of Classification Search
CPC .............................. H04L 64/029; H04L 64/10
See application file for complete search history.

(56) References Cited

U.S. PATENT DOCUMENTS

| | | | | |
|---|---|---|---|---|
| 8,108,924 B1* | 1/2012 | Eberhard | ................ | H04L 63/20 713/154 |
| 2002/0157020 A1* | 10/2002 | Royer | ................. | H04L 63/1425 726/11 |
| 2003/0204756 A1* | 10/2003 | Ransom | ................. | G01D 4/004 713/300 |
| 2008/0016146 A1* | 1/2008 | Gan | .................. | G06F 17/30867 709/203 |
| 2011/0283110 A1* | 11/2011 | Dapkus | ................. | G06F 21/577 713/182 |
| 2012/0079004 A1* | 3/2012 | Herman | .................. | H04L 67/26 709/203 |
| 2016/0112374 A1* | 4/2016 | Branca | .................. | H04L 63/102 726/1 |

* cited by examiner

*Primary Examiner* — Dao Q Ho
(74) *Attorney, Agent, or Firm* — Kowert, Hood, Munyon, Rankin & Goetzel, P.C.

(57) ABSTRACT

Databases that reside on a private network behind a firewall may be difficult to access from a cloud platform on the Internet. Techniques disclosed herein allow an Internet system to communicate with multiple different databases behind multiple different firewalls, however. A client-side private computer system, from behind a firewall, transmits a series of database request status inquires to a server system (not behind the firewall). These status inquiries may be sent as HTTP long poll messages. When the server wishes to query a database on the private network, it responds to one of the database request status inquiries. Because the client-side computer initiated communication, the server response is allowed to pass through the firewall when it might otherwise be blocked. Employing such techniques in parallel allows a server to interact with multiple firewalled databases without the difficulties and inconvenience of attempting a VPN connection.

19 Claims, 8 Drawing Sheets

NETWORKED DATABASE CONNECTIVITY

TECHNICAL FIELD

This disclosure relates to database connectivity, particularly with regard to databases located behind network firewalls.

DESCRIPTION OF THE RELATED ART

Many people utilize databases to store digitally accessible data. Because hese databases are typically connected to communication networks, a database owner may have security and accessibility concerns.

A database may contain confidential or other important data, and if not properly secured, could be compromised by an outside attacker. Such a compromise can cause innumerable negative consequences for the database owner. Additionally, an existing database may contain many years' worth of data, making moving that data to any other location cumbersome and undesirable.

Many database owners therefore choose to keep their database systems behind a network firewall. An attacker who attempts to connect to such a database may simply be unable to, due to the firewall blocking network traffic on one or more restricted ports. Because the firewall can prevent Internet traffic from reaching a database that is on a private network, the security of the database is increased.

Simply using a firewall to protect a database system lacks flexibility, however. An authorized user of the database may be unable to connect to the database from beyond the firewall, for example. Thus, useful data may be inaccessible for those outside of a private network on which a database resides.

DETAILED DESCRIPTION

Figure 1:
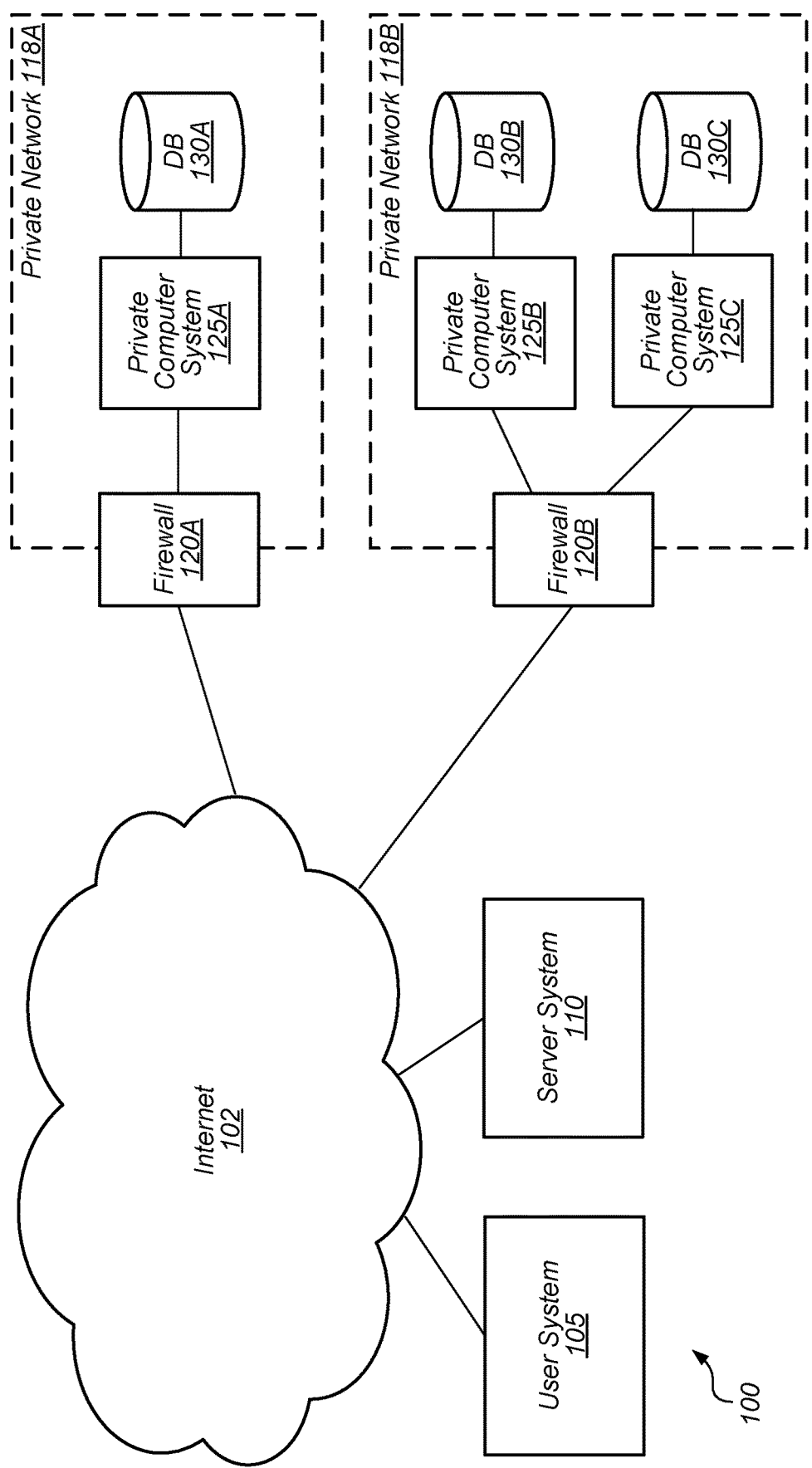
FIG. 1 illustrates an overview of a system in which an Internet server may connect to multiple different databases.

One solution to the problems posed by firewalls is to allow a remote user to connect to a private network via Virtual Private Network (VPN) software. Such software may enable an encrypted connection to a single private network. However, this approach also lacks flexibility, in that the user must use special software to make a connection, and the remote system may be unable to connect to multiple different private networks.

Thus, if a remote user needed data from two different databases situated behind firewalls, for example, the user might have to establish a first VPN connection to the first private network, then disconnect, and open a new VPN connection to the second private network. Any time the user needed to switch between these databases, a cumbersome process of disconnecting and reconnecting via VPN software might be required. Such an approach leaves much to be desired. Attempting to connect to two VPNs simultaneously can also produce a host of other issues, such as competition for inbound packet interception, DNS conflicts, or overlapping IP address conflicts (e.g., if any IPs on the two networks have any overlap). Thus, attempting to connect to two or more VPNs in parallel is unreliable and cumbersome at best.

Accordingly, this disclosure discusses a system in which a computer on the Internet can connect to multiple different private databases (on private networks) without some of the drawbacks of using a VPN approach.

In one aspect discussed below, an Internet system (or any system not on a private network that a database is on) can use an adapted HTTP "long poll" technique to achieve robust database connectivity. Software installed on the client side (e.g., behind a private network) will repeatedly poll a software application that is operating in the cloud, in one embodiment, through a series of push messages that will be permitted as outbound traffic through a firewall. If the cloud application does not need any data from the private database, it does not need to respond to the poll request with a query.

However, if the cloud application does need data from the private database, it will respond to the long poll, and communicate the database request through the firewall. Further, this approach can easily be adapted in parallel, such that a server system on the Internet may receive periodic database status inquiries (e.g., long poll requests) from multiple different private networks. This allows for a flexible "one to many" approach to database connectivity that provides advantages over other techniques.

On a client (private network) side, a received database query will be handled by custom driver software, which, in one embodiment, will translate a database query from a JDBC request to ODBC, SQL, or another database protocol. The private database will then handle the query, and results will be pushed out through the firewall back to the cloud.

Once database query results are received by a cloud application, the data can then be used for whatever purposes are desired. This disclosure, of course, is not limited in this regard—in addition to database access by a cloud application running on a web server, any other suitable Internet system may be configured to access multiple private databases using the techniques described herein.

Turning to FIG. 1, a block diagram 100 is shown of a system in which a server system 110 may connect to multiple different databases 130A, 130B, and 130C, even though these databases are on private networks that server system 110 is not a part of.

Server system 110 is an Internet computer system that is accessible to multiple users in the embodiment shown. Server system 110 may include web server software, and be configured to provide access via one or more web applications. In some embodiments, server system 110 may provide shell access or other programming related services.

User system 105 and server system 110 are connected to the Internet 102 in the figure shown. Firewalls 120A and 120B are also connected to the Internet. Private computer system 125A and database 130A reside on private network 118A, however, while private network 118B includes private computer systems 125B and 125C, as well as databases 130B and 130C.

As shown in FIG. 1, a system that is not on private network 118A or 118B cannot directly connect with a system that is on one of those private networks without a firewall granting access. Thus, in this embodiment, if user system 105 attempts to initiate a direct connection to private computer system 125A, it will not be permitted to do so unless allowed by firewall 120A. Likewise, server system 110 may be unable initiate an unsolicited connection to one of private computer systems 125B or 125C, as they are behind firewall 120B. Using approaches described herein, however, server system 110 may still communicate with systems residing on private networks 118A and 118B.

Database 130A is shown separately from private computer system 125A in FIG. 1. However, database 130A may be part of the same system as private computer system 125A in various embodiments (i.e., database 130A may share a memory, processor or other hardware resource with private computer system 125A). In other embodiments, however, database 130A may be a separate computer system connected to private computer system 125A via a network connection. Database 130A may, without limitation, include a database software system such as ORACLE, IBM DB2, SYBASE, MYSQL, or any other such product. Similar remarks apply to databases 130B and 130C.

Figure 2:
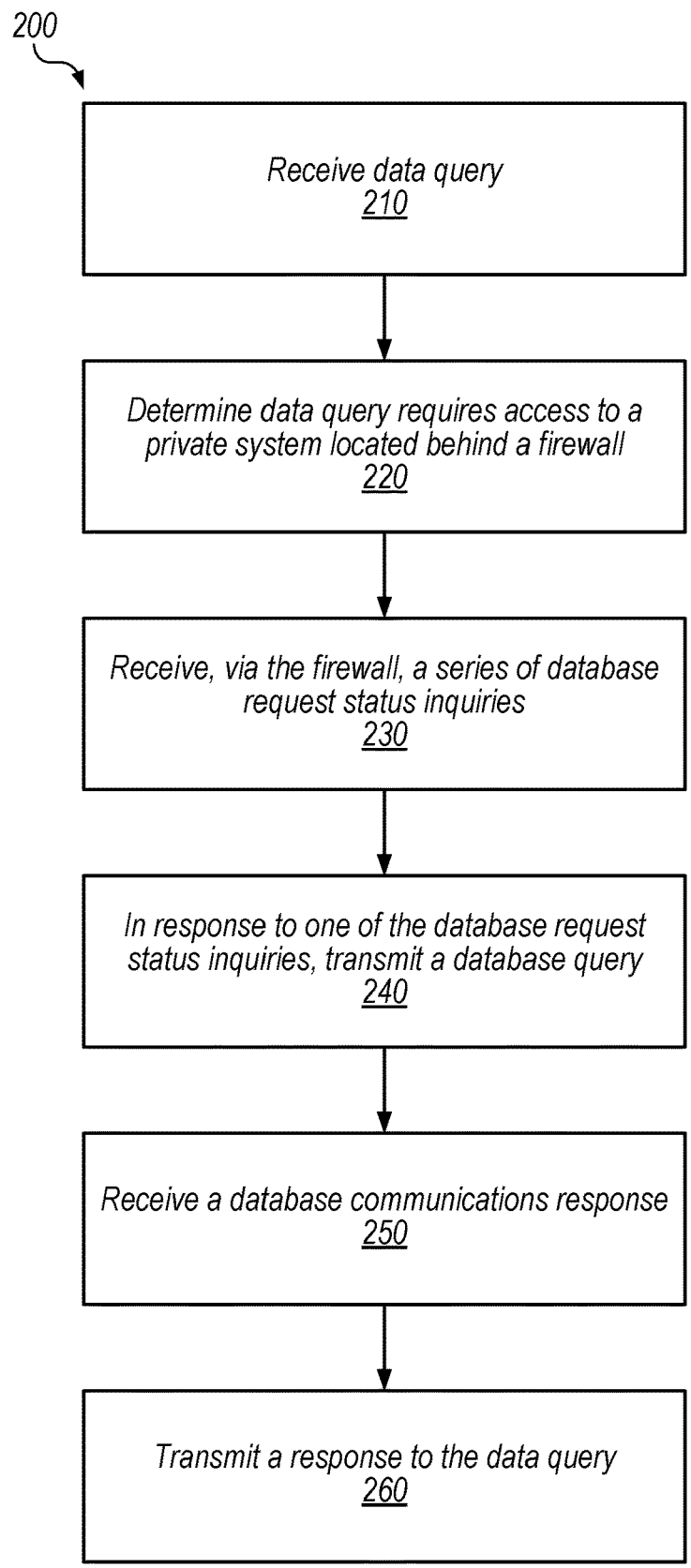
FIG. 2 is a flow diagram illustrating operations that may be performed by a server system relative to accessing a firewalled database.

Turning to FIG. 2, a flowchart 200 is shown of operations that can be implemented by server system 110, or any other suitable computer system. These operations relate to communicating with one or more databases that reside on private networks behind a firewall. While operations are described below relative to server system 110, note that other computer systems may still perform one or more of these operations in various embodiments. Further, operations in flowchart 200 are not required to be performed in the order shown in all embodiments, but may be suitably combined in ways other than that shown.

In operation 210, a data request is received by server system 110. This data request is received from user system 105, in one embodiment. The data request may be in the form of an HTTP request, or may be received via a user that is otherwise logged into server system 110 (e.g. via a secure shell session), in some embodiments.

In one instance, a user of a cloud-based service such as SALESFORCE.COM may be in the process of using a web application, and take an action that requires a display of data. For example, the user might click on an item in the web application that shows a number of items manufactured in the last year by a company. If this data is not stored in the cloud, but is instead on a firewalled database such as database 120A, the data must be retrieved in order to display it to the user. In such a scenario, the data request for operation 210 can be any information received from the user that indicates data is required to be fetched. Thus, the data request for operation 210 can be any action transmitted via an action taken on a web page (click, form submission, etc.)

The data request in operation 210 can also be information received via a command line interface or other programming interface. A user of user system 105 logged into an SSH (secure shell) session with server system 110, for example, can enter one or more commands requesting data. A program running on user system 105 can also transmit information to server system 110 that requests data stored on database 130A.

In operation 220, server system 110 determines that the received data request from operation 210 requires access to a private computer system located behind a firewall. In one embodiment, this determination includes recognizing that the data request is destined for a firewalled database associated with the private computer system. This determination may be based on information explicitly indicated in the data request (such as a target database name) or may be based on a user ID associated with the data request. In one embodiment, this determining includes examining a web-based request (such as a request to display particular data on screen) and then determining that one or more data sources, including the private computer system, must be accessed in order to display the data.

In operation 230, server system 110 receives, via a firewall of a private network, a series of database request status inquiries. HTTP "long poll" requests are used, in one embodiment, for these database request status inquiries. As discussed below, a computer system remote from server system 110 (e.g., private computer system 125A or 125B) is configured to send the database request status inquiries to server system 110.

A long poll request, in one embodiment, includes private computer system 125A making an HTTP request to server system 110. Server system 110 then holds the HTTP request open (by not responding) for a period of time. Note that in contrast to long polling, an ordinary HTTP request for a web page might be responded to relatively immediately (e.g., as soon as the server is able to complete the task). With a long poll, the request may be deliberately kept open for the purpose of facilitating communication from the server to the client. The reason the HTTP response is kept open in this case is because the server may not have any information for the client at the time the HTTP long poll is originally sent—e.g., there is nothing that needs to be pushed from the server to the client. In these circumstances, the server may simply wait until it has information to send to the client, then respond to the HTTP long poll. Note that in various instances, at least a portion of operation 230 may be performed before operation 210—that is, at least one database request status inquiry (e.g., long poll) may be received prior to the data request in operation 210.

A database request status inquiry sent from private computer system 125A to server system 110 may have a maximum time limit that it can be kept open in some embodiments. Thus, after a predetermined period of time, server system 110 may have to send a response, even if that response simply states that no data is requested from private computer system 125A or database 130A at that time. The database request status inquiry may specify a maximum time limit that it can be kept open, in some embodiments, such as 5 seconds, 10 seconds, 1 minute, 10 minutes, 30 minutes, or some other amount of time (note that this disclosure is not limited to these specific examples). In one embodiment, server system 110 does not have to respond to a database request status inquiry before the time-out period. In this embodiment, private computer system 125A may keep track of when a database request status inquiry was sent, and if no response is received by the end of a time-out period, private computer system 125A simply sends another database request status inquiry to server system 110.

Thus, while server system 110 may not be able to initiate an unsolicited communication to private computer system 125A (due to it being behind a firewall), server system 110 receives a series of database status request inquiries from private computer system 125A in operation 230, and can respond to one of those with information as needed.

In operation 240, server system 110 transmits a database query to firewall 120A in response to one of a series of database request status inquiries received from private computer system 125A.

The database query in operation 240 may be sent to firewall 120A via HTTP on the same communication port via which private computer system 125A used to send a database request status inquiry in operation 230. Thus, if port 80 or port 443 is used (HTTP/HTTPS) for the database request status inquiry, the same port may be used in response by server system 110. In various embodiments, this allows server system 110's response to go through firewall 120A, whereas a different port may be blocked. Once received by firewall 120A, the database query will be forwarded to private computer system 125A in this embodiment. Note that unless otherwise specified, the term "HTTP" as used herein may refer to either non-encrypted HTTP (e.g., as may typically be run over port 80) or encrypted HTTPS (e.g., as may typically be run over port 443).

The database query transmitted by server system 110, in various embodiments, is generated by server system 110 based on information included in a data request received from user system 105 (e.g., in operation 210). The database query that is sent to firewall 120A (and ultimately to database 130A) may have different forms, as discussed below.

In some embodiments, the database query transmitted by server system 110 includes one or more database commands (e.g., SQL commands). These commands may be "passed through" to database 130A, which can then execute them. Thus, the database query transmitted by server system 110 may be in a database-ready format. In one embodiment, the database query corresponds to a database connection protocol such as JDBC or ODBC, and includes data and/or commands in a corresponding format. The database query may also be built in the form of an HTTP PUT or HTTP POST transmission.

In operation 250, server system 110 receives a database communications response that includes data generated based on information contained in a database query (e.g., as was transmitted in operation 240). This database communications response can include database data (e.g., values, tables, etc.) and/or metadata in various instances. If the database query cannot be fulfilled, for example, the database communications response may include one or more error codes or explanations. The database communications response may be sent through firewall 120A by private computer system 125 via HTTP in one embodiment.

In operation 260, server system 110 transmits a response to the initial data request (from operation 210) that includes information from the database communications response. This transmitted response may be sent to user system 105, or to another system, in various embodiments. The transmitted response may include any of the data or metadata included in the database communications response.

Server system 110 may generate the response to the initial data request based on a variety of factors, including the format of the initial data request. If the initial data request was from an action taken in a web application, for example, the generated response may include HTML, JAVASCRIPT, CGI, or other web related data. If the initial data request was from a command line interface, raw data may be returned, in another embodiment.

Thus, using the techniques described for FIG. 2 and herein, a system not on private network 118A can request and access data from a database on that private network, without having to use a VPN. Note that the techniques described relative to private network 118A, firewall 120A, private computer system 125A, and database 130A are also applicable to private network 118B, firewall 120B, private computer systems 125B and 125C, and databases 130B and 130C in other embodiments.

Accordingly, in a further embodiment, server system 110 may communicate in parallel with a number of different databases on multiple different private networks, and handle data requests from multiple different devices. Method 200 may thus include server system 110 receiving a plurality of data queries from one or more computing devices, such as such as user system 105. Depending on the context and information contained in these data queries, multiple series of database request status inquiries are received by server system 110 from multiple different private computer systems. Thus, server system 110 receives database request status inquiries from private computer system 125A and 125B, in one embodiment.

In a related embodiment, server system 110 may receive a first and second series of database request status inquiries from private computer system 125B. The first of these series may correspond to database 130B, while the second of these series may correspond to database 130C. In a different embodiment, only one series of database request status inquiries is received from a single computer (e.g., private computer system 125B), regardless of the number of databases that are connected to that computer. Accordingly, in one embodiment, server system 110 may respond to a database request status inquiry from private computer system 125B with a database query intended for either of databases 130B or 130C.

Figure 3:
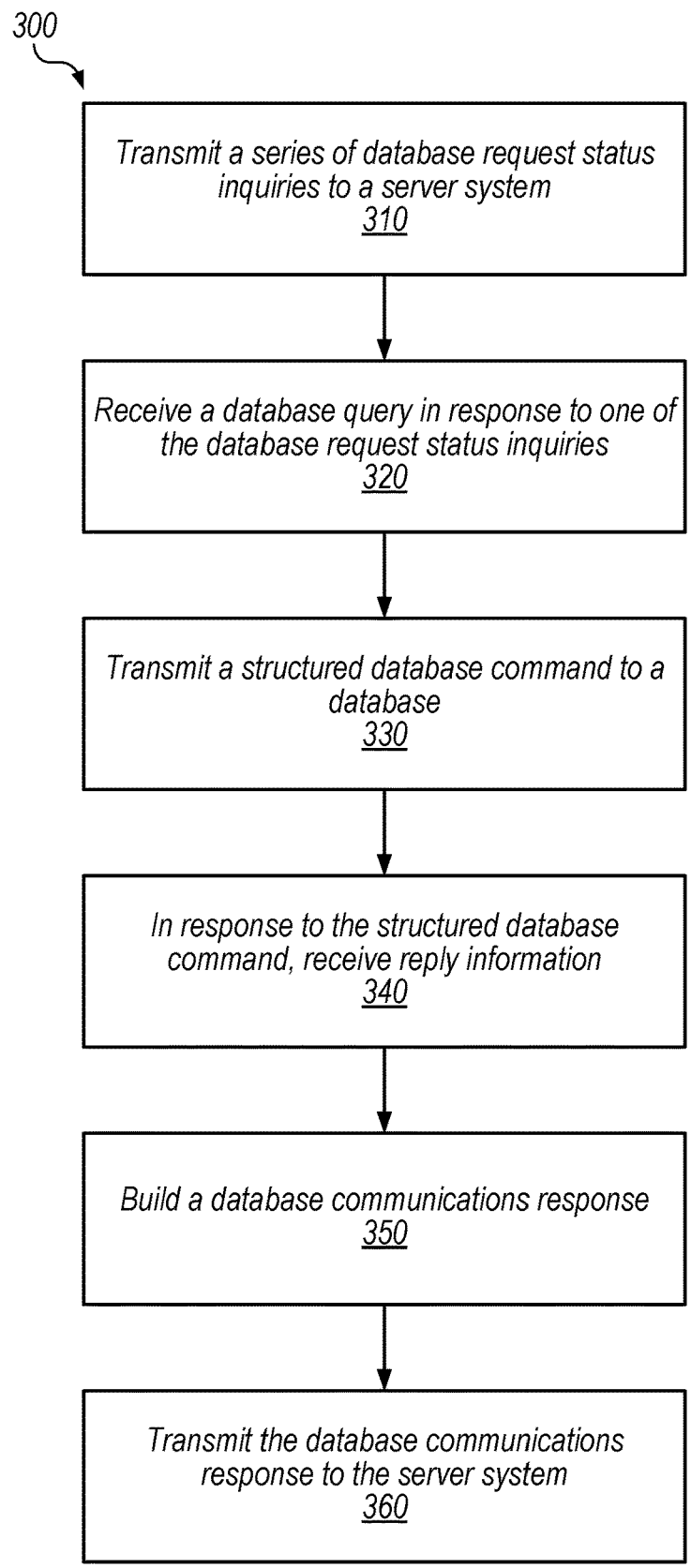
FIG. 3 is a flow diagram illustrating operations may be performed by a private computer system that resides on a firewalled network, relative to accessing a database on that network.

Turning to FIG. 3, a flow diagram 300 is shown of operations that may be performed by private computer system 125A (or another suitable system). The operations of FIG. 3, in various embodiments, are a counterpart performed by private computer system 125A relative to those described above for FIG. 2.

Accordingly, in operation 310, private computer system 125A transmits a series of database request status inquiries to server system 110. These inquiries may be in the form of an HTTP "long poll", as discussed above, allowing them through firewall 120A (which may, in some instances, block outbound traffic on certain ports as well as inbound traffic). Each of the database request status inquiries may be sent at a periodic frequency relative to how long of a time-out period is permitted by private computer system 125A and/or server system 110.

In operation 320, private computer system 125A receives a database query from server system 110 in response to one of the database request status inquiries. This database query may contain one or more SQL commands and/or other information usable to determine data to be retrieved from database 130A, in accordance with the above.

In operation 330, private computer system 125A transmits a structured database command to database 130A. This structured database command is based on the database query received in operation 320 in the embodiment shown.

The structured database command sent to database 130A may simply comprise SQL or other database commands that are passed through via private computer system 125A. In some embodiments, however, private computer system 125A may have to generate the structured database command based on command input specifications for database 130A. In some of these embodiments, for example, a JDBC module running on private computer system 125A will create this structured database command in the form of an ODBC command, SQL command, or other database command that is specific to the command format(s) allowed by database 130A.

In operation 340, private computer system 125A receives reply information from database system 130A in response to the structured database command that was transmitted in operation 330. This reply information may include data and/or metadata from database 130A responsive to the contents of the structured database command.

In operation 350, private computer system 125A builds a database communications response that includes data from the reply information (from operation 340). This database communications response may be formatted according to JDBC or any other suitable protocol. In operation 360, the database communications response built in operation 350 is transmitted to server system 110.

Note that in various embodiments, operations performed in FIG. 2 and FIG. 3 by, e.g., private computer system 125A or server system 110 may involve a firewall such as firewall 120A. In various instances, firewall 120A may comprise third party software. Phrases such as "receiving data via a firewall" may be performed solely by a different system, as this merely requires that the firewall communicate data. Accordingly the claims should not be interpreted to require explicit action to be performed by a firewall unless so indicated.

Figure 4:
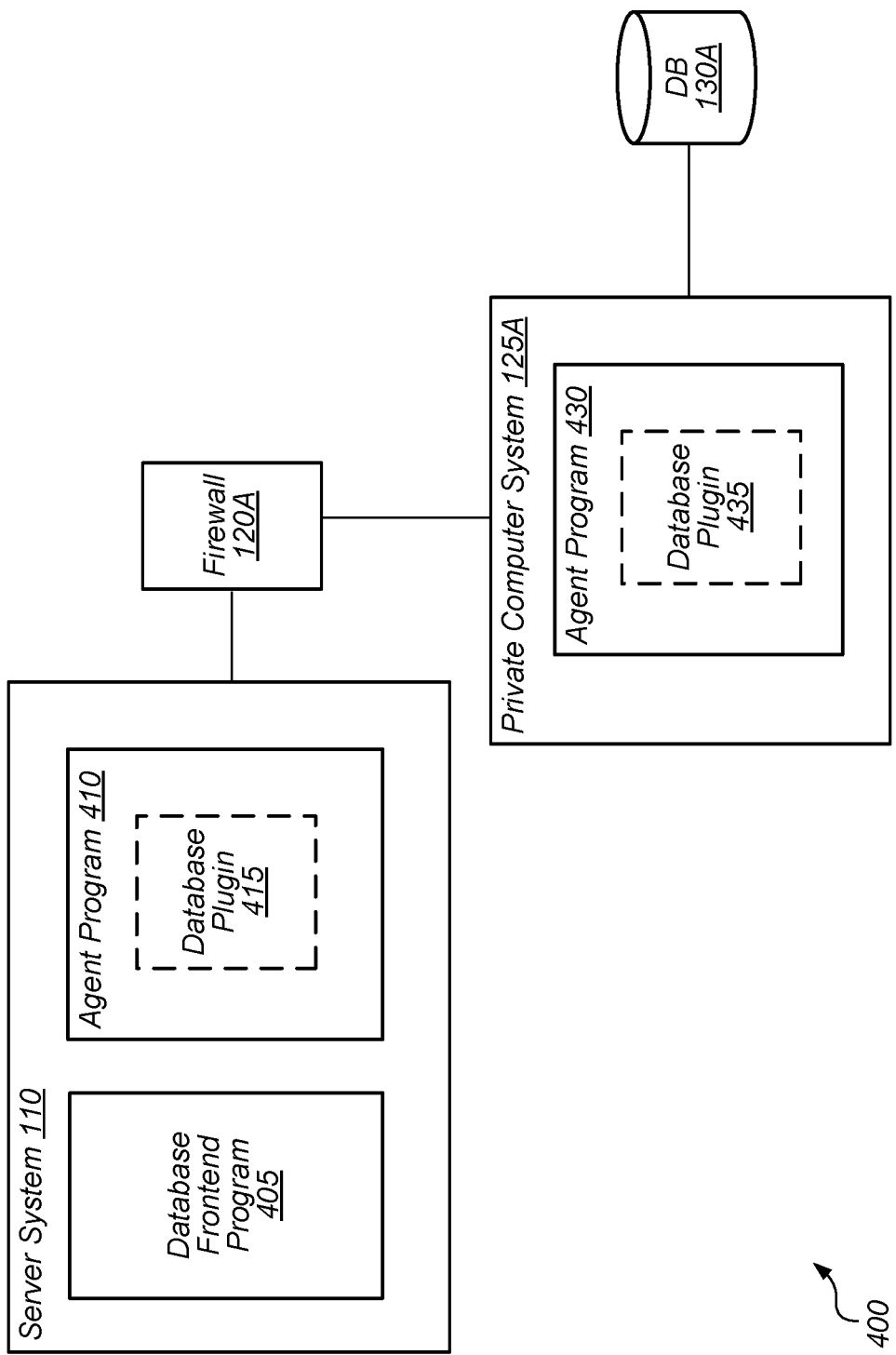
FIG. 4 is a block diagram of one embodiment of a system that includes program modules configured to help facilitate the operations of FIGS. 2-3, and to allow transparent database access.

Turning to FIG. 4, a block diagram is shown of a system 400 that includes program modules configured to help facilitate the operations of FIGS. 2-3, in various embodiments. As shown, server system 110 includes a database frontend program 405 and an agent program 410. Private computer system 125A includes a counterpart agent program 430.

Database frontend program 405, in one embodiment, is a program configured to implement the JDBC API. Thus, a JDBC command (such as a request that involves connecting to database 130A) may be handled by database frontend program 405. Database frontend program 405, in the embodiment shown, is configured to interact with agent program 410 and database plugin 415 to cause data queries to be sent to private computer system 125A via firewall 120A.

Agent program 410, in one embodiment, corresponds to a software product such as SALESFORCE SECURE AGENT. Database plugin 415 is a software component adapted to agent program 410 in the embodiment shown. In this embodiment, database frontend program 405 passes one or more JDBC commands to agent program 410. Database plugin 415 then packages these commands for transmission through firewall 120A (e.g., via HTTP).

At private computer system 125A, agent program 430 then receives the commands and passes them to database plugin 435. Database plugin 435 may then adapt the JDBC commands as needed for whatever format is used by database 130A. This may involve database plugin 435 translating commands to ODBC or any other database format. When a response is received from database 130A, database plugin 435 may then package the response data for transmission via HTTP (through firewall 120A) back to server system 110. At server system 110, database plugin 415 then passes data in a JDBC compliant manner to database frontend program 405. In this manner, a user connected to server system 110 may transparently access database 130A according to the JDBC API without having to worry about intervening firewall and private network issues. To a user of server system 110, database 130A may simply appear to be an ordinary JDBC accessible database.

Computer-Readable Medium

Figure 5:
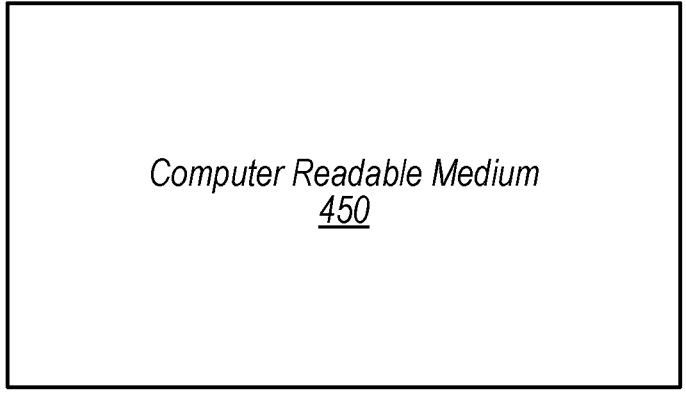
FIG. 5 illustrates a computer-readable medium, according to some embodiments.

Turning briefly to FIG. 5, a block diagram of one embodiment of a computer-readable medium 450 is shown. This computer-readable medium may store instructions corresponding to the operations and/or programs of FIG. 2, FIG. 3, FIG. 4, and/or any other techniques described herein. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VB Script. The instructions stored by computer readable medium 450 are thus configured to cause various operations to be performed by a computer system in various embodiments. Note that as used herein, the term "computer-readable medium" refers to a non-transitory computer readable medium.

Computer System

Figure 6:
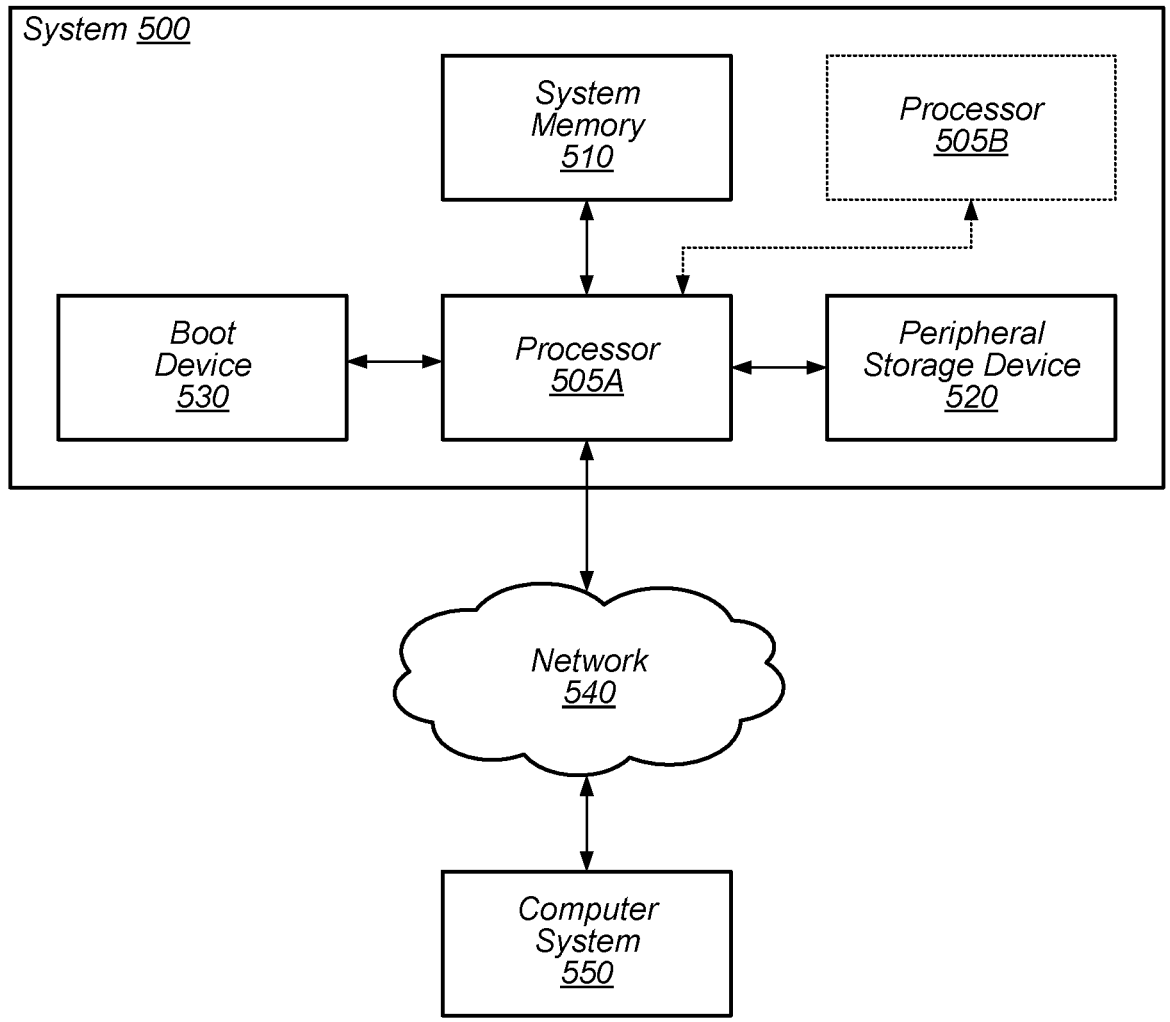
FIG. 6 illustrates a computer system, according to some embodiments.

In FIG. 6, one embodiment of a computer system 500 is illustrated. Various embodiments of this system may be a user system, a server system, a database system, or any other computing system as discussed above and herein. Thus, one or more aspects of computer system 500, in various embodiments, correspond to user system 105, server system 110, firewalls 120A and 120B, private computer systems 125A, 125B, and 125C, and/or databases 130A, 130B, and/or 130C, for example.

In the illustrated embodiment, system 500 includes a first processor 505A, which is coupled to a system memory 510, a peripheral storage device 520 and a boot device 530. System 500 is coupled to a network 540, which is in turn coupled to another computer system 550. In some embodiments, system 500 may include more than one instance of the devices shown. In various embodiments, system 500 may be configured as a rack-mountable server system, a standalone system, or in any other suitable form factor. In some embodiments, system 500 may be configured as a client system rather than a server system. System 500 may be a smartphone, tablet, laptop, or appear in any other configuration that would occur to one with skill in the art.

In some embodiments, system 500 may be configured as a multiprocessor system, in which processor 505A may optionally be coupled to one or more other instances of a processor, such as processor 505B. For example, processors 505A-B may be coupled to communicate via respective coherent processor interfaces. In one embodiment, processor 505A is a CPU, while processor 505 is a GPU, though system 500 is not thus limited.

In various embodiments, system memory 510 may comprise any suitable type of system memory as described above, such as FB-DIMM, DDR/DDR2/DDR3/DDR4 SDRAM, or RDRAM®, for example. System memory 510 may include multiple discrete banks of memory controlled by discrete memory interfaces in embodiments of processor 100 that provide multiple memory interfaces. Also, in some embodiments, system memory 510 may include multiple different types of memory.

Peripheral storage device 520, in various embodiments, may include support for magnetic, holographic, optical, or solid-state storage media such as hard drives, optical disks, nonvolatile RAM devices, etc. In some embodiments, peripheral storage device 520 may include more complex storage devices such as disk arrays or storage area networks (SANs), which may be coupled to processor 100 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 100, such as multimedia devices, graphics/display devices, standard input/output devices, etc. In one embodiment, peripheral storage device 520 may be coupled to processor 505A via peripheral interface(s). In one embodiment a boot device 530 may include a device such as an FPGA or ASIC configured to coordinate initialization and boot up of system 500, such as from a power-on reset state.

Network 540 may include any suitable devices, media and/or protocol for interconnecting computer systems, such as wired or wireless Ethernet, for example. In various embodiments, network 540 may include local area networks (LANs), wide area networks (WANs), telecommunication networks, or other suitable types of networks. In some embodiments, computer system 550 may be similar to or identical in configuration to illustrated system 500, whereas in other embodiments, computer system 550 may be substantially differently configured. For example, computer system 550 may be a server system, a processor-based client system, a stateless "thin" client system, a mobile device, etc. Note that a "computer system" as discussed herein may refer to two or more networked devices, in at least one embodiment.

Exemplary Multi-Tenant Database System

Figure 7:
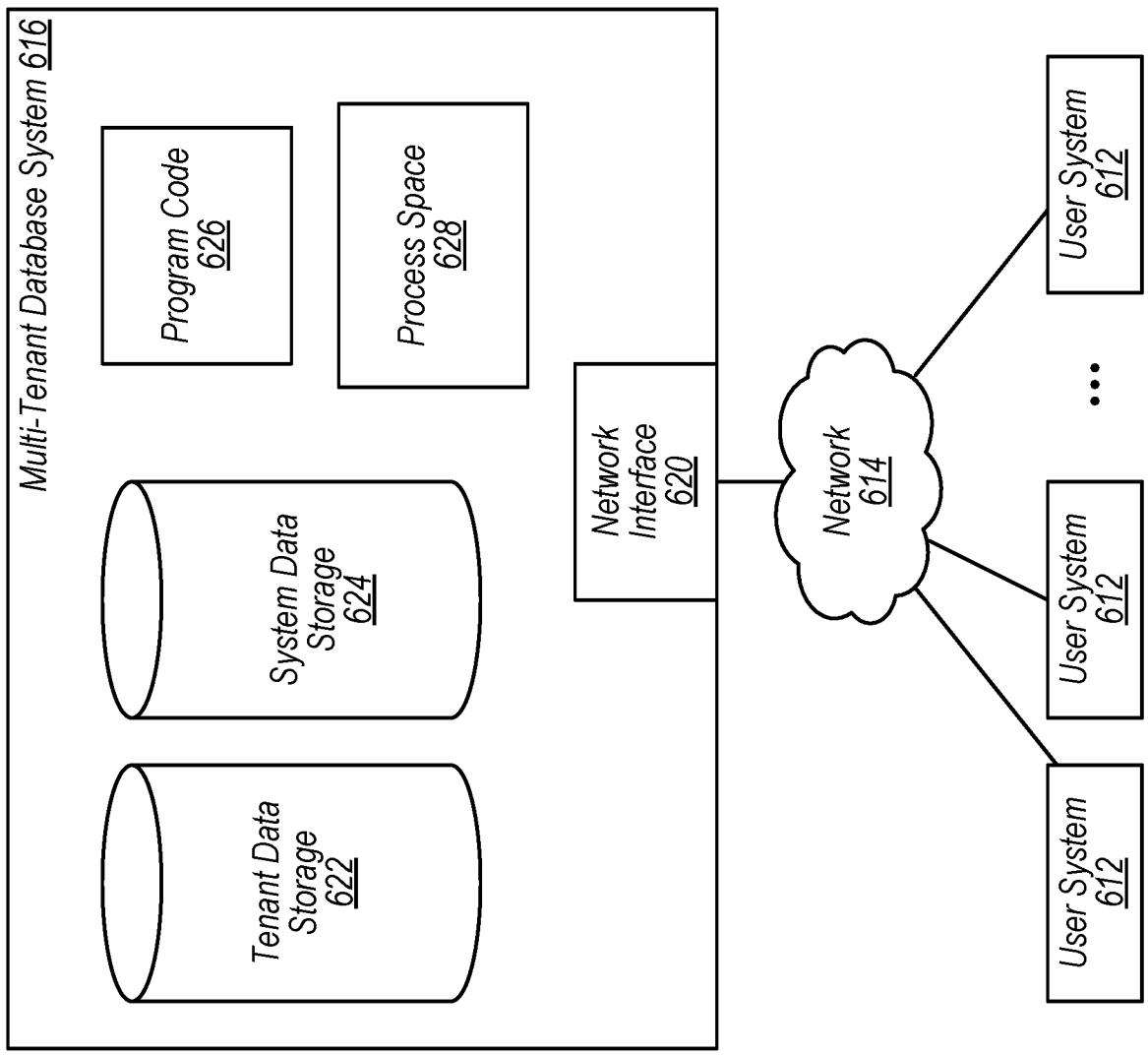
FIG. 7 illustrates a multi-tenant database system, according to some embodiments.

Turning to FIG. 7, an illustration is shown of illustrates an exemplary environment in which a multi-tenant database system might be implemented. Multi-tenant database 616, as shown, may function as part of computer system 500 in some embodiments. Further, multi-tenant database 616 may supply data in association with data requests for display within graphical regions of a web page. Thus, any of the graphical regions shown in FIGS. 2A-2D, for example, may include data that has been retrieved from multi-tenant database 616.

As illustrated in FIG. 7 (and in more detail in FIG. 8) one or more user systems 612 may interact via a network 614 with a multi-tenant database system (MTS) 616. The users of those user systems 612 may be users in differing capacities and the capacity of a particular user system 612 might be determined by the current user. For example, when a salesperson is using a particular user system 612 to interact with MTS 616, that user system 612 may have the capacities allotted to that salesperson. However, while an administrator is using the same user system 612 to interact with MTS 616, it has the capacities allotted to that administrator.

Network 614 may be a LAN (local area network), WAN (wide area network), wireless network, point-to-point network, star network, token ring network, hub network, or any other appropriate configuration. The global internetwork of networks often referred to as the "Internet" with a capital "I," will be used in many of the examples herein and is one example of a TCP/IP (Transfer Control Protocol and Internet Protocol) network. It should be understood, however, that the networks that the present invention may utilize any of various other types of networks.

User systems 612 may communicate with MTS 616 using TCP/IP and, at a higher network level, use other common Internet protocols to communicate, such as HTTP, FTP, AFS, WAP, etc. As an example, where HTTP is used, user system 612 might include an HTTP client for sending and receiving HTTP messages from an HTTP server at MTS 616. Such a server might be implemented as the sole network interface between MTS 616 and network 614, but other techniques might be used as well or instead. In some implementations, the interface between MTS 616 and network 614 includes load sharing functionality, such as round-robin HTTP request distributors to balance loads and distribute incoming HTTP requests evenly over a plurality of servers. Each of the plurality of servers has access to the MTS's data, in various embodiments, at least for the users that are accessing a server.

In some embodiments, the system shown in FIG. 7 implements a web-based customer relationship management (CRM) system. For example, in some embodiments, MTS 616 includes application servers configured to implement and execute CRM software applications as well as provide related data, code, forms, web pages and other information to and from user systems 612 and to store to, and retrieve from, a database system related data, objects and web page content. In one embodiment of multi-tenant system 616, tenant data is arranged so that data of one tenant is kept separate from that of other tenants so that that one tenant does not have access to another tenant's data, unless such data is expressly shared.

One arrangement for elements of MTS 616 is shown in FIG. 7, including a network interface 620, storage 622 for tenant data, storage 624 for system data accessible to MTS 616 and possibly multiple tenants, program code 626 for implementing various functions of MTS 616, and a process space 628 for executing MTS system processes and tenant-specific processes, such as running applications as part of an application service.

Each user system 612 may be a desktop personal computer, workstation, laptop, PDA, cell phone, or any WAP-enabled device or any other computing device capable of interfacing directly or indirectly to the Internet or other network connection. User system 612 may execute an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., subscriber of a CRM system) of user system 612 to access, process, and view information and pages available to it from MTS 616 over network 614. Each user system 612 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 616 or other systems or servers. As discussed above, the present invention is suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

In some embodiments, each user system 612 and its components are operator configurable using applications, such as a browser, that include computer code executable on one or more processing elements. Similarly, in some embodiments, MTS 616 (and additional instances of MTSs, where more than one is present) and their components are operator configurable using application(s) that include computer code executable on one or more processing elements. Thus, various operations described herein may be performed by executing program instructions stored on a non-transitory computer-readable medium and executed by one or more processing elements.

According to one embodiment, each MTS 616 is configured to provide web pages, forms, applications, data, and/or media content to user systems 612 to support the access by user systems 612 as tenants of MTS 616. As such, in this embodiment, MTS 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, MTSs may include one or more logically and/or physically connected servers distributed locally or across one or more geographic locations. Additionally, the term "server" includes a computer system, including processing hardware and process space(s), and an associated storage system and database application as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

Figure 8:
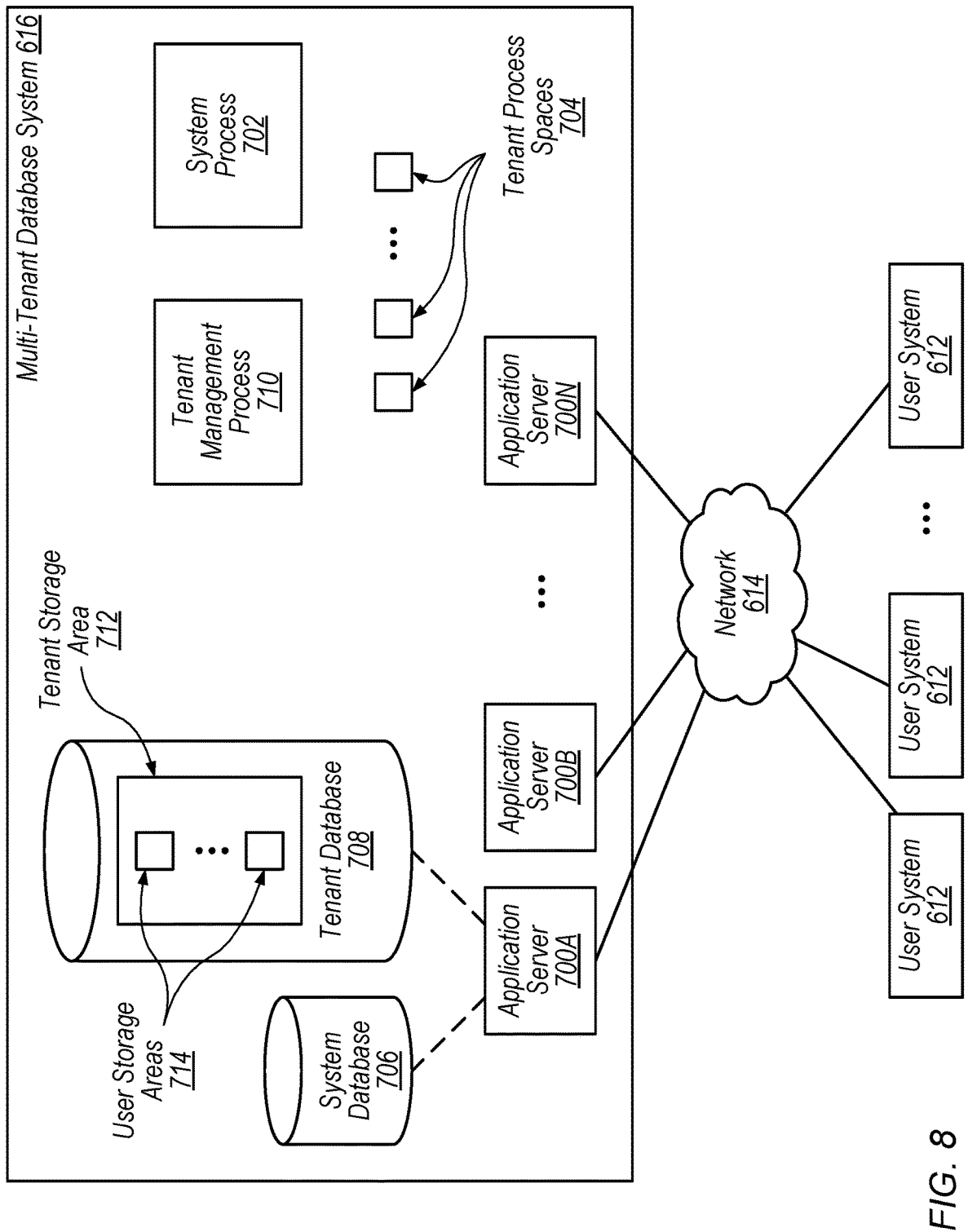
FIG. 8 illustrates further details regarding a multi-tenant database system, according to some embodiments.

FIG. 8 illustrates certain embodiments of an MTS 616 and various interconnections in more detail. In this example, the network interface is implemented as one or more HTTP application servers 700. Also shown is system process space 702 including individual tenant process spaces 704, a system database 706, tenant database(s) 708 and a tenant management process space 710. Tenant database 108 might be divided into individual tenant storage areas 712, which can be either a physical arrangement or a logical arrangement. Within each tenant storage area 712, user storage 714 might be allocated for each user.

In certain aspects, each application server 700 is configured to handle requests for any user/organization. Because it may be desirable to be able to add and remove application servers from the server pool at any time for any reason, there is not necessarily a server affinity for a user and/or organization to a specific application server 700. In one embodiment, therefore, an interface system (not shown) implementing a load balancing function (e.g., an F5 Big-IP load balancer) is communicably coupled between the servers 700 and the user systems 612 to distribute requests to the servers 700. In one aspect, the load balancer uses a least connections algorithm to route user requests to the servers 700. Other examples of load balancing algorithms, such as are round robin and observed response time, also can be used. For example, in certain aspects, three consecutive requests from the same user could hit three different servers, and three requests from different users could hit the same server. In this manner, MTS 616 is multi-tenant in one or more embodiments, wherein the MTS 616 handles storage of different objects and data across disparate users and organizations.

As an example of storage, one tenant might be a company that employs a sales force where each salesperson uses MTS 616 to manage their sales process. Thus, a user might maintain contact data, leads data customer follow-up data, performance data, goals and progress data, all applicable to that user's personal sales process (e.g., in tenant database 708). In some MTS embodiments, since all of this data and the applications to access, view, modify, report, transmit, calculate, eta, can be maintained and accessed by a user system having nothing more than network access, the user can manage his or her sales efforts and cycles from any of many different user systems. For example, if a salesperson is paying a visit to a customer and the customer has Internet access in their lobby, the salesperson can obtain critical updates as to that customer while waiting for the customer to arrive in the lobby.

While each user's sales data may be separate from other users' sales data regardless of the employers of each user, some data may be organization-wide data shared or accessible by a plurality or all of the sales three for a given organization that is a tenant. Thus, there may be some data structures managed by MTS 616 that are allocated at the tenant level while other data structures are managed at the user level. Because an MTS may support multiple tenants including possible competitors, the MTS should have security protocols that keep data, applications and application use separate. Also, because many tenants will opt for access to an MTS rather than maintain their own system, security, redundancy, up-time and backup are more critical functions and need to be implemented in the MTS.

In addition to user-specific data and tenant-specific data, MTS 616 might also maintain system level data usable by multiple tenants. Such system level data might include industry reports, news, postings, and the like that are sharable among tenants.

In certain aspects, client systems 612 communicate with application servers 700 to request and update system-level and tenant-level data from MTS 616 that may require one or more queries to database system 706 and/or database system 708. In some embodiments, MTS 616 automatically generates one or more SQL statements (the SQL query) designed to access the desired information.

Each database may generally be viewed as a set of logical tables containing data fitted into predefined categories. Each table typically contains one or more data categories logically arranged in physical columns. Each row of a table typically contains an instance of data for each category defined by the columns. For example, a CRM database may include a table that describes a customer with columns for basic contact information such as name, address, phone number, fax number, etc. Another table may describe a purchase order, including columns for information such as customer, product, sale price, date, etc.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

Further, note that the term "based on" as used herein is inclusive, rather than exclusive. Thus, something said to be "based on A" is not precluded from also being based on B in various embodiments. However, in other embodiments, something said to be "based on A" could be exclusively based on A (that is, saying something is "based on A" does not imply that thing must necessarily be based on other factors as well).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure. The claims and present disclosure are also not limited to examples given in the Abstract.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-readable medium having stored thereon computer instructions that are capable of causing a server computer system to perform operations comprising:
    receiving, from a private computer system located behind a firewall of a private network, a database request status inquiry, wherein the firewall is operable to prevent unsolicited requests that are initiated by the server computer system from reaching the private computer system, and wherein the database request status inquiry initiates a connection between the private computer system and the server computer system that allows the server computer system to send information to the private computer system on behalf of one of a plurality of client computer systems coupled to the server computer system;
    maintaining the connection for a specified duration of time;
    during the specified duration of time:
        receiving, over a wide-area network, a data request from a particular one of the plurality of client computer systems;
        in response to determining that the data request is requesting access to the private computer system, sending, to the private computer system via the firewall, a response to the database request status inquiry, wherein the response includes a database query that is based on the data request received from the particular client computer system;
        receiving, from the private computer system via the firewall, a database communications response that includes data generated based on information contained in the database query; and
        transmitting a response to the data request that includes information from the database communications response.

2. The non-transitory computer-readable medium of claim 1, wherein the database query corresponds to a database connection protocol used by a database connected to the private computer system.

3. The non-transitory computer-readable medium of claim 1, wherein receiving the database request status inquiry comprises receiving a HTTP request.

4. The non-transitory computer-readable medium of claim 1, wherein the operations further comprise generating the response to the data request, wherein the response to the data request is transmitted via HTTP.

5. The non-transitory computer-readable medium of claim 1, wherein the operations further comprise:
    receiving a plurality of data requests from one or more client computer systems;
    receiving a plurality of series of database request status inquiries from a respective plurality of private computer systems located behind a plurality of firewalls of a plurality of private networks; and
    in response to different database request status inquiries of the plurality of series of database request status inquiries, transmitting a plurality of database queries to different ones of the plurality of firewalls.

6. The non-transitory computer-readable medium of claim 1, wherein the database request status inquiry indicates the specified duration of time for which the connection can be maintained.

7. The non-transitory computer-readable medium of claim 1, wherein the operations further comprise:
    receiving another database request status inquiry from the private computer system in response to the specified duration of time elapsing.

8. The non-transitory computer-readable medium of claim 1, wherein the response to the database request status inquiry is sent on a same network port from which the database request status inquiry is received.

9. The non-transitory computer-readable medium of claim 1, wherein the operations further comprise:
    receiving a second database request status inquiry from the private computer system, wherein the database request status inquiry enables access to data stored in a first database managed by the private computer system, and wherein the second database request status inquiry enables access to data stored in a second database managed by the private computer system.

10. A method, comprising:
    receiving, by a server computer system from a private computer system located behind a firewall of a private network, a database request status inquiry, wherein the firewall is operable to prevent unsolicited requests that are initiated by the server computer system from reaching the private computer system, and wherein the database request status inquiry initiates a connection between the server computer system and the private computer system that allows the server computer system to send information to the private computer system on behalf of one of a plurality of client computer systems coupled to the server computer system;
    maintaining, by the server computer system, the connection for a specified duration of time;
    during the specified duration of time:
        receiving, by the server computer system over a wide-area network, a data request from a particular one of the plurality of client computer systems;
        in response to determining that the data request is requesting access to the private computer system, the server computer system transmitting, to the private computer system via the firewall, a response to the database request status inquiry, wherein the response includes a database query that is based on the data request received from the particular client computer system;
        receiving, by the server computer system via the firewall from the private computer system, a database communications response that includes data generated based on information contained in the database query; and transmitting, by the server computer system, a response to the data request that includes information from the database communications response.

11. The method of claim 10, wherein at least a portion of the database query transmitted to the private computer system is encrypted, but wherein transmitting the database query is performed without the use of a virtual private network (VPN) connection to the private network.

12. The method of claim 10, further comprising the server computer system providing user authorization information that is associated with the data request to the private computer system via the firewall, wherein the received database communications response is based on the user authorization information.

13. The method of claim 10, further comprising building the database query, prior to the transmitting, in the format of an HTTP PUT or HTTP POST transmission.

14. The method of claim 10, wherein the database query is configured to be executable as a Java Database Connectivity (JDBC) request by the private computer system.

15. The method of claim 10, wherein the database query is transmitted via a same communication port of the firewall as was used to transmit the database request status inquiry.

16. A non-transitory computer-readable medium having computer instructions stored thereon that are capable of being executed to cause a private computer system that is located behind a firewall of a private network to perform operations comprising:

transmitting, via the firewall, a database request status inquiry to a server computer system on a different network, wherein the firewall is operable to prevent unsolicited requests that are initiated by the server computer system from reaching the private computer system, wherein the database request status inquiry initiates a connection between the private computer system and the server computer system that allows the server computer system to send information through the firewall to the private computer system on behalf of one of a plurality of client computer systems coupled to the server computer system, and wherein the server computer system is operable to maintain the connection for a specified duration of time;

during the specified duration of time, receiving, in response to the database request status inquiry, a database query from the server computer system, wherein the server computer system is operable to generate the database query based on a data request received from a particular one of the plurality of client computer systems during the specified duration of time;

transmitting, to a database, a structured database command based on the database query;

receiving, from the database in response to the structured database command, reply information;

building a database communications response that includes data from the reply information; and transmitting, to the server computer system, the database communications response wherein the server computer system is operable to transmit a response to the data request that includes information from the database communications response.

17. The non-transitory computer-readable medium of claim 16, wherein the operations further comprise generating the structured database command based on command input specifications for the database.

18. The non-transitory computer-readable medium of claim 16, wherein the operations further comprise allowing the server computer system to make database queries, through the firewall, to a plurality of databases on the private network that are accessible to the private computer system.

19. The non-transitory computer-readable medium of claim 16, wherein the operations further comprise determining, based on the received database query, which of a plurality of databases on the private network that the database query is directed to.

* * * * *